US011128933B2

(12) United States Patent
Ting et al.

(10) Patent No.: US 11,128,933 B2
(45) Date of Patent: Sep. 21, 2021

(54) METHOD AND SYSTEM FOR ENCODING AND DECODING MULSEMEDIA STREAMS

(71) Applicant: Dublin City University, Dublin (IE)

(72) Inventors: Bi Ting, Dublin (IE); Zou Longhao, Dublin (IE); Gabriel-Miro Muntean, Dublin (IE)

(73) Assignee: DUBLIN CITY UNIVERSITY, Dublin (IE)

(*) Notice: Subject to any disclaimer, the term of this patent is extended or adjusted under 35 U.S.C. 154(b) by 0 days.

(21) Appl. No.: 16/912,860

(22) Filed: Jun. 26, 2020

(65) Prior Publication Data

US 2021/0021911 A1 Jan. 21, 2021

(30) Foreign Application Priority Data

Jun. 26, 2019 (GB) .................................... 1909157

(51) Int. Cl.
| | |
|---|---|
| *G06F 15/16* | (2006.01) |
| *H04N 21/845* | (2011.01) |
| *H04L 29/08* | (2006.01) |
| *H04L 29/06* | (2006.01) |
| *H04N 21/2343* | (2011.01) |

(52) U.S. Cl.
CPC ....... *H04N 21/8456* (2013.01); *H04L 65/608* (2013.01); *H04L 67/02* (2013.01); *H04N 21/23439* (2013.01)

(58) Field of Classification Search
CPC .......... H04N 21/8456; H04N 21/23439; H04L 65/608; H04L 67/02

USPC .......................................................... 709/231
See application file for complete search history.

(56) References Cited

U.S. PATENT DOCUMENTS

| | | | |
|---|---|---|---|
| 2013/0060911 A1* | 3/2013 | Nagaraj ............. | H04N 21/4622 709/219 |
| 2017/0111706 A1* | 4/2017 | Kim ................... | H04N 21/8456 |
| 2018/0035176 A1* | 2/2018 | Stockhammer ....... | H04L 65/602 |
| 2018/0316740 A1* | 11/2018 | Stockhammer ....... | H04L 65/608 |
| 2018/0367637 A1* | 12/2018 | Balazinski ....... | H04N 21/64322 |
| 2019/0191203 A1* | 6/2019 | Asbun ................ | H04N 21/2668 |

* cited by examiner

*Primary Examiner* — Alan S Chou
(74) *Attorney, Agent, or Firm* — K&L Gates LLP

(57) ABSTRACT

The method and system of the present invention provides Dynamic Adaptive Streaming over HTTP (DASH)-based Adaptive Rich Media Delivery Solution (DASH-ARM) which performs adaptive delivery of mulsemedia content by improving the perceived QoE levels which improves user's sense of reality. In its dynamic adjustment of multiple sensorial content characteristics, DASH-ARM performs a trade-off between video quality and presence of diverse other sensorial components which include components such as haptic, olfaction and wind. This trade-off relies on the fact that the presence of other sensorial components has a masking effect on potential audio/video quality variations. DASH-ARM is complemented by an adaptive multi-sensory media stream (mulsemedia) which synchronizes at the user device, where the multimedia content and mulsemedia comprises diverse sensorial stimuli.

13 Claims, 5 Drawing Sheets

METHOD AND SYSTEM FOR ENCODING AND DECODING MULSEMEDIA STREAMS

Cross Reference to Related Applications

This application claims priority to and the benefit of United Kingdom Patent Application No. 1909157.8 filed on Jun. 26, 2019, the entire disclosures of each of which are incorporated by reference herein.

FIELD

The present disclosure relates to a method and system for encoding and decoding mulsemedia streams.

BACKGROUND

Multimedia is mostly composed of audio and video, and very seldom text, targeting two human senses only. Multi-sensory Media (mulsemedia) refers to the combination of multimedia objects (video and audio) and components targeting other human senses such as touch, smell, and taste.

Current mulsemedia applications may use two standards designed by the Moving Picture Experts Group (MPEG): MPEG-7 (ISO/IEC 15938) and MPEG-V (ISO/IEC 23005). MPEG-7 is designed to describe multimedia content data, whereas MPEG-V is designed to interface with virtual worlds. Current mulsemedia distribution is performed mostly locally. The few networked-enabled solutions proposed employ a one-solution-fits-all approach or require specific protocols for content delivery and do not support the widely used HTTP protocol.

The state of the art focuses on the emerging communication technologies which enrich user perceived QoE by involving media stimuli which target vision, auditory, tactile, olfaction, gustatory and other human senses. Therefore state of the art research and development is focused on finding ways to overcome many existing challenges in acquiring, storing, displaying and exchanging mulsemedia content and propose solutions to address them.

However, there are still challenges related to using mulsemedia, including synchronization with the traditional multimedia content and delivery over diverse network environments.

Hence there is an unresolved and unfulfilled need for a method and system which provides multiple media elements to mulsemedia content in order to engage three or more human senses (i.e. sight, sound, touch and smell), performing adaptive delivery of mulsemedia, adjusting its transmission to existing network conditions and synchronizing the presentation of its diverse components in order to create an immersive mulsemedia environment that increases quality of user experience (QoE).

SUMMARY

The present invention is directed to encoding Multi-sensory Media or mulsemedia steams using dynamic adaptive streaming over hypertext transfer protocol (DASH)-based adaptive rich media delivery solution (DASH-ARM).

The system for encoding/decoding a mulsemedia steam comprises a web server 301 and a plurality of devices capable of rendering mulsemedia content e.g. the device 302.

In one embodiment the web server 301 comprises a processor 301a, a memory and or databases(s) 301b operatively coupled to the processor 301a and a transceiver 301c operatively coupled to said processor 301a. The transceiver 301c receives a hypertext transfer protocol (HTTP) request from the device 302, said HTTP request comprising one or more of a segment information, the device capabilities, and/or user experience feedback from a user of the device. Based on the HTTP request received from the device 302 the processor 301a encodes the multi-sensory media presentation description (Mulse-MPD) data stream. The Mulse-MPD data stream comprises a plurality of period structure segments 102. Each of the plurality of period structure segments 102 comprises a start time in reference to the beginning of the mulsemedia stream and the duration of the mulsemedia stream. Further each of the plurality of period structure segments 102 comprises a plurality of mulse-adaptation segments 103. Each mulse-adaptation segment 103 comprises a type of the mulse-adaptation segment, a universal resource locator identifying the base location of mulsemedia data, and a plurality of representation segments 104. Each representation segment 104 comprises an intensity level of the multi-sensory effect to be caused by the device 302 and a plurality of mulsemedia segments 105. Each mulsemedia segment 105 comprises a flag indicating whether said mulsemedia segment 105 is full or empty, an offset time in reference to the beginning of the mulsemedia segment 105 and a relative universal resource locator with reference to the base location identifying the mulsemedia content.

Further the processor transmits the encoded multi-sensory media presentation description (Mulse-MPD) data stream to the device 302 using the transceiver.

In one embodiment the client or device 302 comprises a processor 302a, a memory and or databases(s) 302b operatively coupled to the processor 302a, a transceiver 302c operatively coupled to said processor 302a and a plurality of output devices 302d operatively coupled to the processor 302a. The transceiver 302c of the device 302 is configured to transmit a hypertext transfer protocol (HTTP) request to the web server 301, said HTTP request comprising one or more of a segment information, the device 302 capabilities, and/or user experience feedback from a user of the device 302. Further, the transceiver 302c of the device 302 is configured to receive a multi-sensory media presentation description (Mulse-MPD) data stream from the web server 301 in response to the request.

The processor 302a of the device decodes the multi-sensory media presentation description (Mulse-MPD) data stream. Further, the processor 302a is configured to cause said one or more output devices 302d to provide sensory stimulus to the user of the device based on the decoded multi-sensory media presentation description (Mulse-MPD) data stream.

Thereby, the present invention provides a method and system for performing adaptive delivery of mulsemedia, adjusting its transmission to existing network conditions and synchronizing the presentation of its diverse components in order to create an immersive mulsemedia environment that increases quality of user experience (QoE).

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

The present invention is directed to Dynamic Adaptive Streaming over HTTP (DASH)-based Adaptive Rich Media Delivery Solution (DASH-ARM) which performs adaptive delivery of mulsemedia content by improving the perceived QoE levels which improves user's sense of reality. In its dynamic adjustment of multiple sensorial content characteristics, DASH-ARM performs a trade-off between video quality and presence of diverse other sensorial components which include components such as haptic, olfaction and wind. This trade-off relies on the fact that the presence of other sensorial components has a masking effect on potential audio/video quality variations. DASH-ARM is complemented by an adaptive multi-sensory media stream (mulsemedia) which synchronizes at the user device, where the multimedia content and mulsemedia comprises diverse sensorial stimuli.

Figure 1:
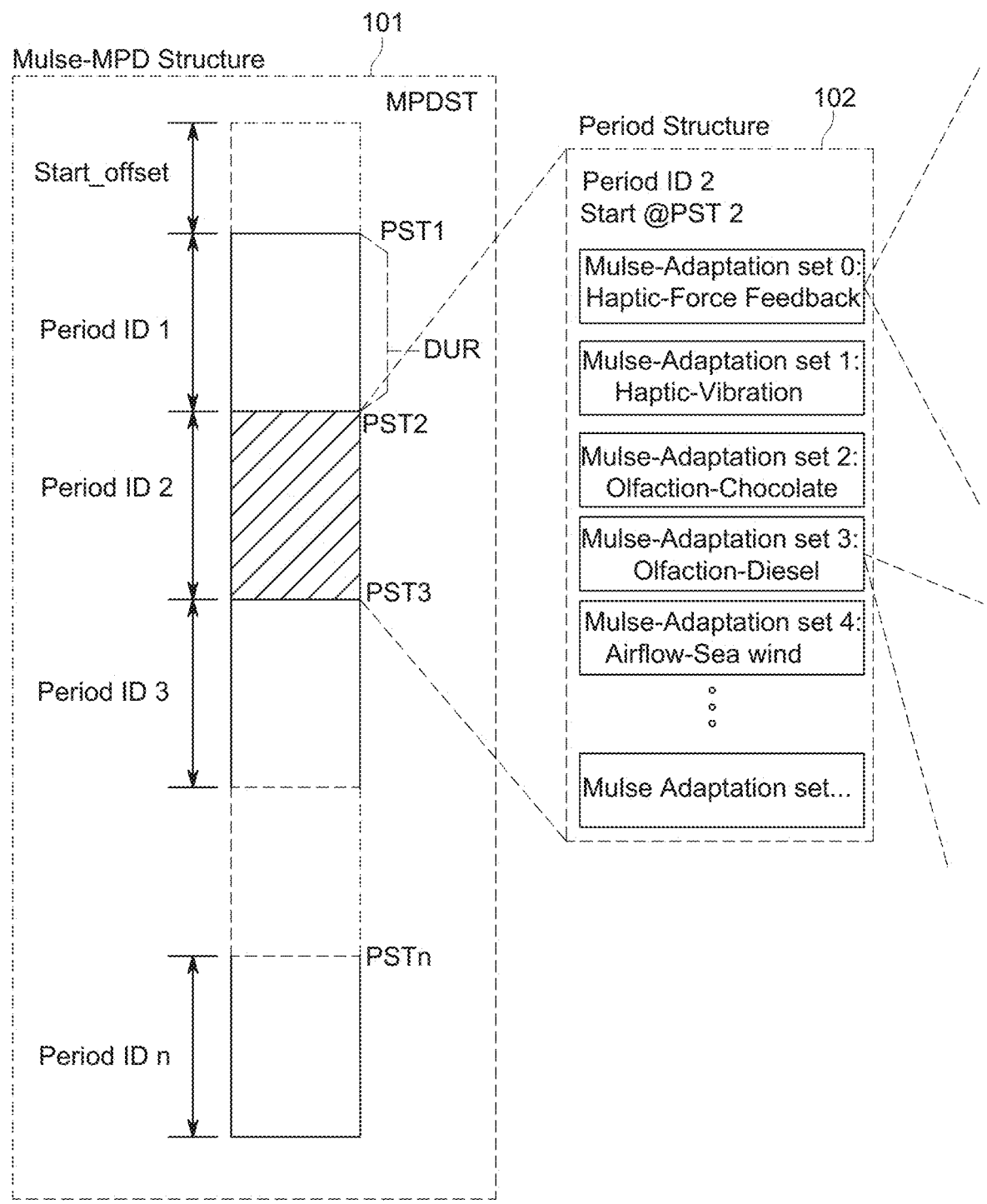
FIG. 1 exemplarily illustrates the components of an encoded mulsemedia data stream in accordance with some of the embodiments of the present invention.
Figure 1:
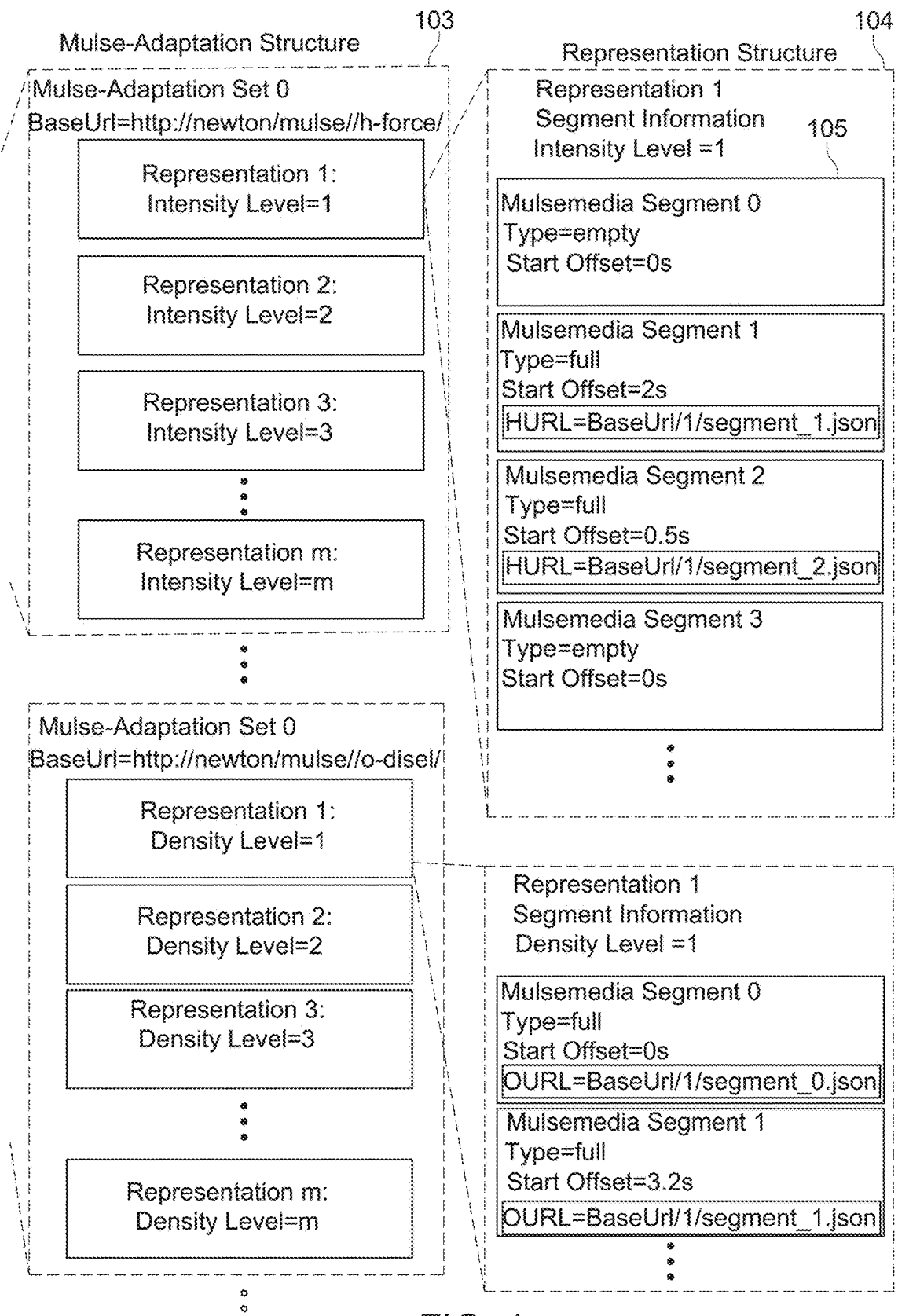

FIG. 1 exemplarily illustrates the components of an encoded mulsemedia data stream in accordance with some of the embodiments of the present invention. The mulsemedia data stream comprises a multi-sensory media presentation description (Mulse-MPD) 101. The Mulse-MPD 101 comprises Periods 102, Mulse-Adaptation Sets 103, Representations 104 and Mulsemedia Segments 105. The Mulse-MPD 101 includes a sequence of Periods 102, where each Period contains the top-level description of a sensory element including the start time (i.e. PST) and duration (i.e. DUR) as exemplarily illustrated in FIG. 1. Thus, Mulse-MPD 101 accommodates rich variability in Multi-sensorial devices which follow diverse production standards, sensory media codecs and inter-communication protocols. Therefore, each Period contains several Mulse-Adaptation Sets 103 that are associated with different adaptation groups defined by users or systems depending on one or more of mulsemedia effect types, device characteristics, user preferences, and scenarios.

In each Mulse-Adaptation Set 103, the same sensory content may be encoded and shown in different Mulse-MPD Representations 104. The Mulse-MPD Representation 104 comprises specific features of the sensory content. For example, the haptic effect may have different Mulse-MPD Representations which differ in terms of their intensity levels. Similarly, the olfaction effect may have different density/intensity levels, as shown in FIG. 1. Additionally, the different Mulse-MPD Representations 104 may have different start offsets and play durations. The Representation 104 thus enables adaptation of different sensory effects based on one or more of network conditions, device characteristics, and pricing strategies for the mulsemedia content.

Mulsemedia Segments 105 contain the actual sensory media information and describe the type of sensory effect, start time, duration, effect intensity and other content-related data, encoded in JavaScript Object Notation (JSON) format. The mulsemedia segments 105 also includes location of the stored wind mulsemedia content (WURL), location of the stored haptic mulsemedia content (HURL) and location of the stored olfactory mulsemedia content (OURL), which are used respectively to indicate the address of Wind effect mulsemedia content, Haptic effect mulsemedia content and Olfaction effect mulsemedia content, respectively. A person skilled in the art would appreciate that mulsemedia content of other sensorial effects may also be considered.

Figure 2:
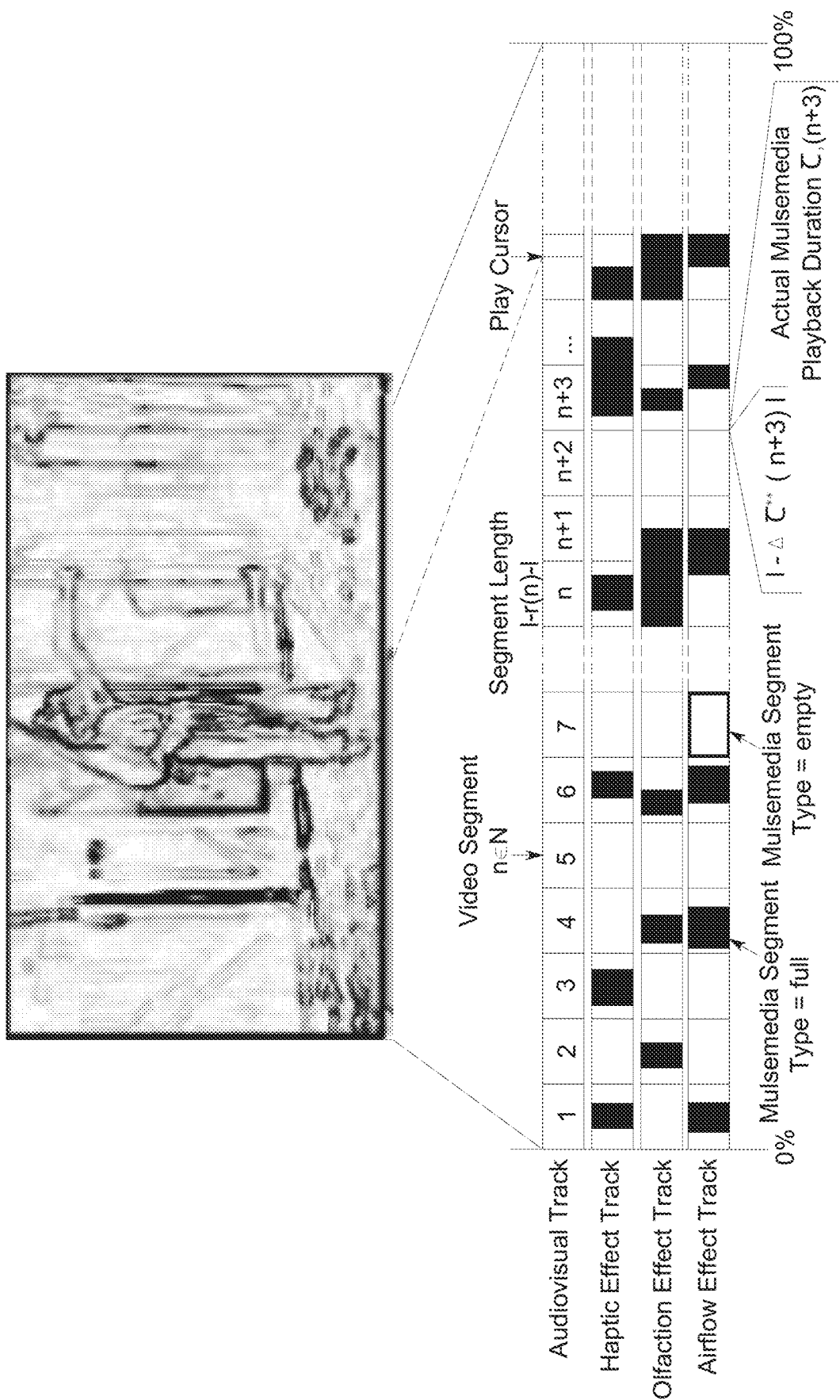
FIG. 2 is a timing diagram exemplarily illustrating the synchronization of various mulsemedia components with the corresponding multimedia components in accordance with some of the embodiments of the present invention.

FIG. 2 is a timing diagram exemplarily illustrating the synchronization of various mulsemedia segments with the corresponding multimedia segments in accordance with some of the embodiments of the present invention. The timing diagram clearly illustrates that the receiver synchronizes the audio-visual track/segments with the mulsemedia segments decoded from the mulsemedia stream received from a server. More specifically, FIG. 2 clearly shows that the haptic effect track/segments, the olfaction effect track/segments, and airflow effect track/segments i.e. the mulsemedia segments are synchronized with the audio-visual track/segments.

Figure 3:
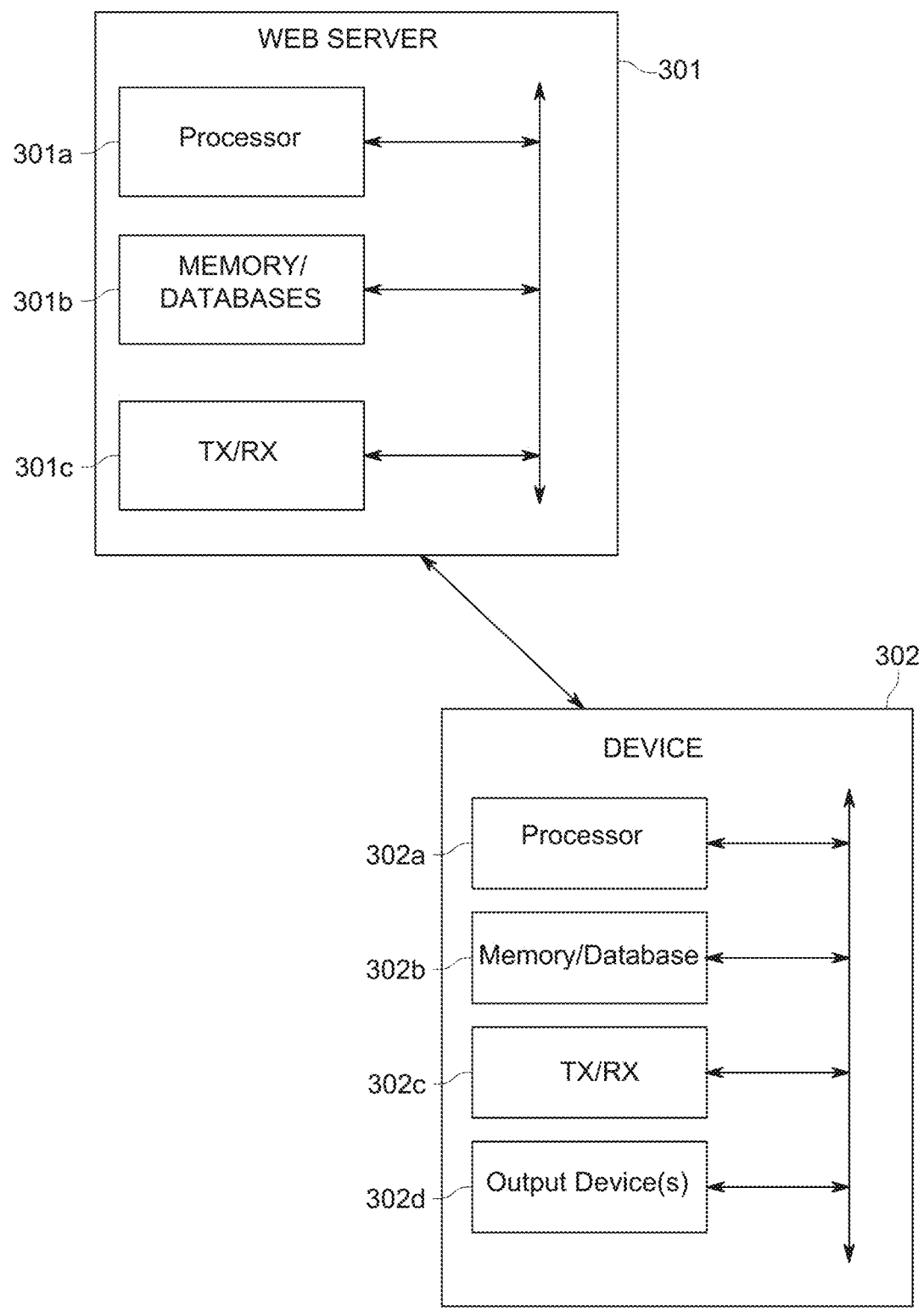
FIG. 3 is a functional diagram of the system for encoding and decoding a mulsemedia stream in accordance with some of the embodiments of the present invention.

A person skilled in the art may appreciate that mulsemedia streaming is not always continuous. Depending on the audio-visual scene design, at any moment in time, there may or may not be required a multi-sensorial effect playout. Therefore these effects are distributed discretely along the continuous audio-visual content timeline. According to the Mulse-MPD 101 structure, the discretely distributed mulsemedia content will be divided into mulsemedia segments 105 and only some of them involve mulsemedia content. Also, as disclosed above, FIG. 2 exemplarily illustrates mulsemedia segments of type "full" and type "empty", where in "full" mulsemedia segments comprise mulsemedia content to played by a user device and "empty" mulsemedia segments are discarded. Further, FIG. 2 illustrates the time offset value stored in the mulsemedia segments which determines the playback starting time of the mulsemedia segment in reference to the timeline of the mulsemedia segment. FIG. 3 is a functional diagram of the system for encoding and decoding a mulsemedia stream in accordance with some of the embodiments of the present invention. The web server 301 in communication with the device 302 is capable of DASH-ARM. The web server or DASH-ARM server 301 facilitates the HTTP responses to the multimedia/mulsemedia segment requests received from the device or client-side 302. Further the web server 301 is configured to integrate the mulsemedia stream and the multimedia stream, handle of specific feedback from clients (e.g. network information, device characteristics, user experience feedback) and distribution management of multimedia/mulsemedia data.

Further, the web server 301 provides support for accessing mulsemedia/multimedia content by remote DASH-ARM clients or device 302 via HTTP-based communication. The web server 301 stores both MPEG-DASH metadata in Media Presentation Description (MPD) format and mulsemedia metadata, labelled Mulse-MPD. The device 302 requests and retrieves from the server 301 the MPEG-DASH MPD and Mulse-MPD files associated with the desired content and the client or device 302 accesses the appropriate media segments from their distributed storage locations.

The subsequent paragraphs would describe the method and system for encoding a mulsemedia stream in reference to FIG. 1, and FIG. 3. As disclosed above, the system for encoding/decoding a mulsemedia steam comprises a web server 301 and a plurality of devices capable of rendering mulsemedia content e.g. the device 302.

The web server 301 comprises a processor 301a, a memory and or databases(s) 301b operatively coupled to the processor 301a and a transceiver 301c operatively coupled to said processor 301a. The transceiver 301c receives a hypertext transfer protocol (HTTP) request from the device 302, said HTTP request comprising one or more of a segment information, the device capabilities, and/or user experience feedback from a user of the device. Based on the HTTP request received from the device 302 the processor 301a encodes the multi-sensory media presentation description (Mulse-MPD) data stream. The Mulse-MPD data stream comprises a plurality of period structure segments 102. Each of the plurality of period structure segments 102 comprises a start time in reference to the beginning of the mulsemedia stream and the duration of the mulsemedia stream. Further each of the plurality of period structure segments 102 comprises a plurality of mulse-adaptation segments 103. Each mulse-adaptation segment 103 comprises a type of the mulse-adaptation segment, a universal resource locator identifying the base location of mulsemedia data, and a plurality of representation segments 104. Each representation segment 104 comprises an intensity level of the multi-sensory effect to be caused by the device 302 and a plurality of mulsemedia segments 105. Each mulsemedia segment 105 comprises a flag indicating whether said mulsemedia segment 105 is full or empty, an offset time in reference to the beginning of the mulsemedia segment 105 and a relative universal resource locator with reference to the base location identifying the mulsemedia content.

In an embodiment the processor 301a is configured to encode the multi-sensory media presentation description (Mulse-MPD) using JavaScript Object Notation (JSON). In a preferred embodiment, the type of the mulse-adaptation segment comprises one of a haptic-force feedback type, a haptic-vibration type, an olfactory type and an airflow type.

Further the processor transmits the encoded multi-sensory media presentation description (Mulse-MPD) data stream to the device 302 using the transceiver.

The memory 302b stores computer readable code for configuring the processor 302a to perform the above mentioned functions of the processor 302a. Further the memory 302b may comprise databases for storing the audio-visual content and the mulsemedia content.

The client or device 302 comprises a processor 302a, a memory and or databases(s) 302b operatively coupled to the processor 302a, a transceiver 302c operatively coupled to said processor 302a and a plurality of output devices 302d operatively coupled to the processor 302a. The output devices 302d comprises audio output device, video output device, a haptic-force feedback device, a haptic-vibration device, an olfaction device and an airflow device. A person skilled in the art will appreciate that the output devices 302d may also comprise devices which provide sensory stimulus to a user of the device 302.

The transceiver 302c of the device 302 is configured to transmit a hypertext transfer protocol (HTTP) request to the web server 301, said HTTP request comprising one or more of a segment information, the device 302 capabilities, and/or user experience feedback from a user of the device 302. Further, the transceiver 302c of the device 302 is configured to receive a multi-sensory media presentation description (Mulse-MPD) data stream from the web server 301 in response to the request.

The processor 302a of the device decodes the multi-sensory media presentation description (Mulse-MPD) data stream. Further, the processor 302a is configured to cause said one or more output devices 302d to provide sensory stimulus to the user of the device based on the decoded multi-sensory media presentation description (Mulse-MPD) data stream.

A person skilled in the art would appreciate that present invention addresses two major technical problems i.e. adaptive mulsemedia streaming and synchronization between multimedia and mulsemedia content. Experimental results have confirmed the present invention has an effect of increasing QoE levels, whereas network performance evaluation results of the present invention exhibits significantly lower inter-media delay results.

Figure 4:
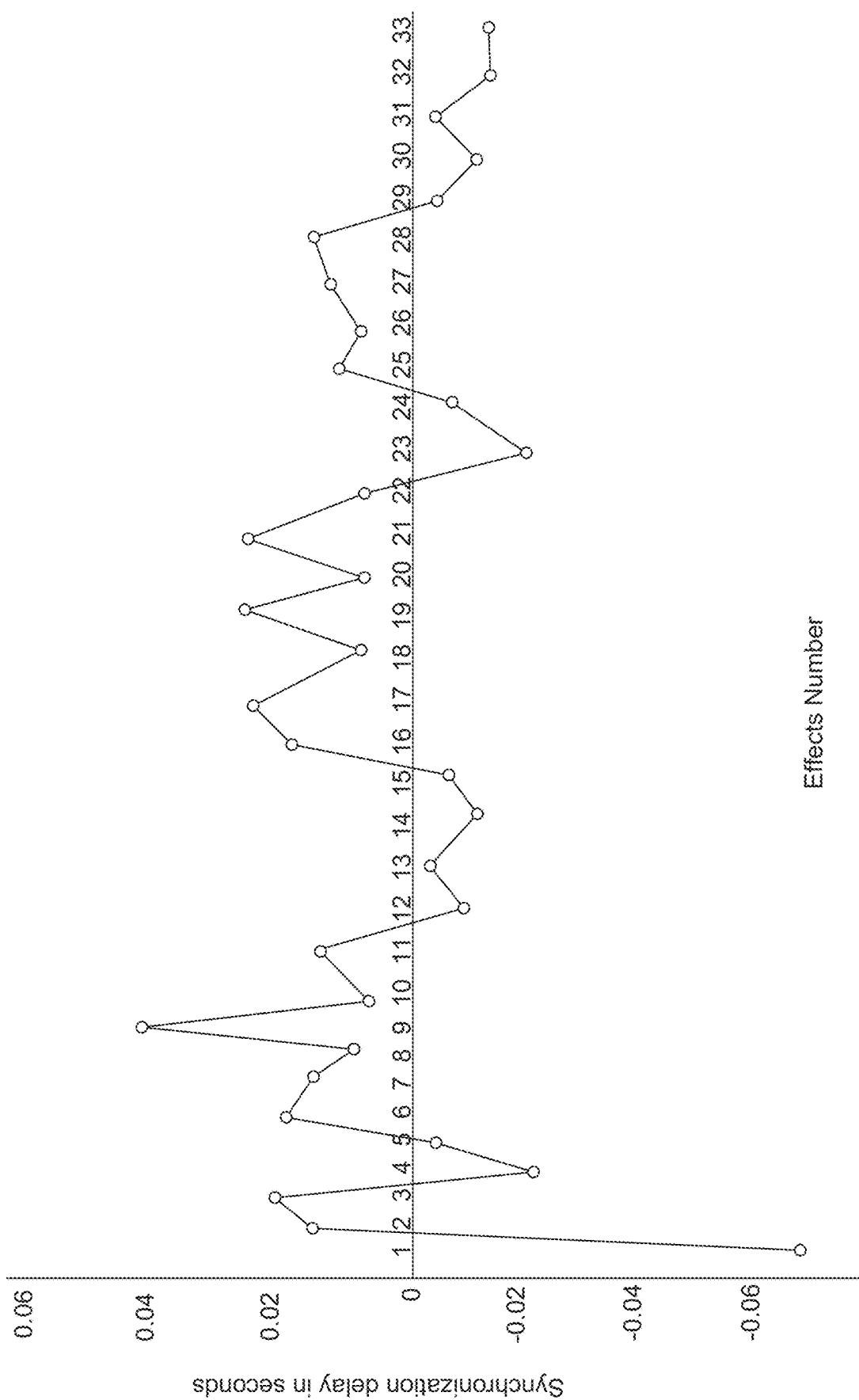
FIG. 4 exemplarily illustrates the synchronization performance of various mulsemedia components with the corresponding multimedia components in accordance with some of the embodiments of the present invention.

FIG. 4 exemplarily illustrates the synchronization performance of various mulsemedia components with the corresponding multimedia components in accordance with some of the embodiments of the present invention. A person skilled in the art would appreciate that the experimental data while testing of the present invention exhibit synchronization delays are within ±0.07 seconds which is significantly lower than the industry standard inter-media delay requirements. Further, a person ordinarily skilled in the art will appreciate that the various illustrative logical/functional blocks, modules, circuits, and process steps described in connection with the embodiments disclosed herein may be implemented as electronic hardware, or a combination of hardware and software. To clearly illustrate this interchangeability of hardware and a combination of hardware and software, various illustrative components, blocks, modules, circuits, and steps have been described above generally in terms of their functionality. Whether such functionality is implemented as hardware or a combination of hardware and software depends upon the design choice of a person ordinarily skilled in the art. Such skilled artisans may implement the described functionality in varying ways for each particular application, but such obvious design choices should not be interpreted as causing a departure from the scope of the present invention.

The process described in the present disclosure may be implemented using various means. For example, the apparatus described in the present disclosure may be implemented in hardware, firmware, software, or any combination thereof. For a hardware implementation, the processing units, or processors(s) or controller(s) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, software codes may be stored in a memory and executed by a processor. Memory may be implemented within the processor unit or external to the processor unit. As used herein the term "memory" refers to any type of volatile memory or nonvolatile memory.

In the specification the terms "comprise, comprises, comprised and comprising" or any variation thereof and the terms include, includes, included and including" or any variation thereof are considered to be totally interchangeable and they should all be afforded the widest possible interpretation and vice versa.

A person skilled in the art would appreciate that the above invention provides a robust and economical solution to the problems identified in the prior art.

The invention is not limited to the embodiments hereinbefore described but may be varied in both construction and detail.

The invention claimed is:

1. A method for encoding a mulsemedia stream, comprising:
   receiving a hypertext transfer protocol (HTTP) request from a device, said HTTP request comprising one or more of a segment information, the device capabilities, and/or user experience feedback from a user of the device;
   encoding a multi-sensory media presentation description (Mulse-MPD) data stream, said Mulse-MPD data stream comprising:
     a plurality of period structure segments, each of the plurality of period structure segments comprising:
       a start time in reference to the beginning of the mulsemedia stream and the duration;
       a plurality of mulse-adaptation segments, each mulse-adaptation segment comprising:
         a type of the mulse-adaptation segment, a universal resource locator identifying the base location of mulsemedia data, and a plurality of representation segments, each representation segment comprising:
           an intensity level of the multi-sensory effect to be caused by the device and a plurality of mulsemedia segments, each mulsemedia segment comprising:
             a flag indicating whether said mulsemedia segment is full or empty;
             an offset time in reference to the beginning of the mulsemedia segment; and
             a relative universal resource locator with reference to the base location identifying the mulsemedia content;
   transmitting said encoded multi-sensory media presentation description (Mulse-MPD) data stream to the device.

2. The method of claim 1, wherein the multi-sensory media presentation description (Mulse-MPD) data stream is encoded using JavaScript Object Notation (JSON).

3. The method of claim 1, wherein the type of the mulse-adaptation segment comprises one of a haptic-force feedback type, a haptic-vibration type, an olfactory type and an airflow type.

4. A method for decoding a mulsemedia stream by a device, comprising:
   transmitting a hypertext transfer protocol (HTTP) request to a web server, said HTTP request comprising one or more of a segment information, the device capabilities, and/or user experience feedback from a user of the device;
   receiving a multi-sensory media presentation description (Mulse-MPD) data stream;
   decoding the multi-sensory media presentation description (Mulse-MPD) data stream, said Mulse-MPD data stream comprising:
     a plurality of period structure segments, each of the plurality of period structure segments comprising:
       a start time in reference to the beginning of the mulsemedia stream and the duration;
       a plurality of mulse-adaptation segments, each mulse-adaptation segment comprising:
         a type of the mulse-adaptation segment, a universal resource locator identifying the base location of mulsemedia data, and a plurality of representation segments, each representation segment comprising:
           an intensity level of the multi-sensory effect to be caused by the device and a plurality of mulsemedia segments, each mulsemedia segment comprising:
             a flag indicating whether said mulsemedia segment is full or empty;
             an offset time in reference to the beginning of the mulsemedia segment; and
             a relative universal resource locator with reference to the base location identifying the mulsemedia content.

5. The method of claim 4, wherein the multi-sensory media presentation description (Mulse-MPD) data stream is encoded using JavaScript Object Notation (JSON).

6. The method of claim 4, wherein the type of the mulse-adaptation segment comprises one of a haptic-force feedback type, a haptic-vibration type, an olfactory type and an airflow type.

7. A web server for encoding a mulsemedia stream, comprising:
   a transceiver for:
     receiving a hypertext transfer protocol (HTTP) request from a device, said HTTP request comprising one or more of a segment information, the device capabilities, and/or user experience feedback from a user of the device; and
     transmitting an encoded multi-sensory media presentation description (Mulse-MPD) data stream to the device;
   a processor operatively coupled to the transceiver for:
     encoding the multi-sensory media presentation description (Mulse-MPD) data stream, said Mulse-MPD data stream comprising:
       a plurality of period structure segments, each of the plurality of period structure segments comprising:
         a start time in reference to the beginning of the mulsemedia stream and the duration;
         a plurality of mulse-adaptation segments, each mulse-adaptation segment comprising:
           a type of the mulse-adaptation segment, a universal resource locator identifying the base location of mulsemedia data, and a plurality of representation segments, each representation segment comprising:
             an intensity level of the multi-sensory effect to be caused by the device and a plurality of mulsemedia segments, each mulsemedia segment comprising:
               a flag indicating whether said mulsemedia segment is full or empty;
               an offset time in reference to the beginning of the mulsemedia segment; and
               a relative universal resource locator with reference to the base location identifying the mulsemedia content.

8. The web server of claim 7, wherein the multi-sensory media presentation description (Mulse-MPD) data stream is encoded using JavaScript Object Notation (JSON).

9. The web server of claim 7, wherein the type of the mulse-adaptation segment comprises one of a haptic-force feedback type, a haptic-vibration type, an olfactory type and an airflow type.

10. A device for decoding a mulsemedia stream, comprising:
    a transceiver for transmitting a hypertext transfer protocol (HTTP) request to a web server, said HTTP request comprising one or more of a segment information, the device capabilities, and/or user experience feedback from a user of the device; and
    receiving a multi-sensory media presentation description (Mulse-MPD) data stream;

a processor operatively coupled to the transceiver for:
  decoding the multi-sensory media presentation description (Mulse-MPD) data stream, said Mulse-MPD data stream comprising:
    a plurality of period structure segments, each of the plurality of period structure segments comprising:
    a start time in reference to the beginning of the mulsemedia stream and the duration;
    a plurality of mulse-adaptation segments, each mulse-adaptation segment comprising:
    a type of the mulse-adaptation segment, a universal resource locator identifying the base location of mulsemedia data, and a plurality of representation segments, each representation segment comprising:
    an intensity level of the multi-sensory effect to be caused by the device and a plurality of mulsemedia segments, each mulsemedia segment comprising:
    a flag indicating whether said mulsemedia segment is full or empty;
    an offset time in reference to the beginning of the mulsemedia segment; and
    a relative universal resource locator with reference to the base location identifying the mulsemedia content; and
  one or more output devices operatively coupled to the processor, wherein the processor causes said one or more output devices to provide sensory stimulus to the user of the device based on the decoded multi-sensory media presentation description (Mulse-MPD) data stream.

11. The device of claim 10, wherein the multi-sensory media presentation description (Mulse-MPD) data stream is encoded using JavaScript Object Notation (JSON).

12. The device of claim 10, wherein the type of the mulse-adaptation segment comprises one of a haptic-force feedback type, a haptic-vibration type, an olfactory type and an airflow type.

13. The device of claim 10, wherein the one or more output devices is one of a haptic-force feedback device, a haptic-vibration device, an olfaction device and an airflow device.

* * * * *